Patented Oct. 12, 1948

2,451,411

UNITED STATES PATENT OFFICE 2,451,411

SATURATED POLYHALOALKYL SULFIDES AND METHODS FOR THEIR PREPARATION

Maynard S. Raasch, Wilmington, Del., assignor to E. I. du Pont de Nemours & Company, Wilmington, Del., a corporation of Delaware No Drawing. Application March 7, 1946, Serial No. 652,825

12 Claims. (Cl. 260—608)

This invention relates to saturated polyhaloalkyl sulfides and methods for their preparation. More particularly this invention relates to new saturated polyfluoroethyl sulfides and their preparation by reacting sulfur halides with certain halogenated ethylenes.

Heretofore, attempts to prepare saturated halogenated organic sulfides by the addition of sulfur halides to chlorinated ethylenes have not been successful. When sulfur monochloride is reacted with haloethylenes containing hydrogen in the presence of aluminum chloride an unsaturated product is obtained.

It is an object of this invention to provide new saturated polyfluoroethyl sulfides. Another object of this invention is to provide an effective method for reacting sulfur halides with a halogenated ethylene free of hydrogen and containing at least three fluorine atoms. A still further object is to provide new chloropolyhaloethyl sulfides containing at least six fluorine atoms. A particular object is to provide a process for the addition of a sulfur chloride to a tetrahaloethylene containing at least three fluorine atoms. Other objects will appear hereinafter.

These objects are accomplished by the addition of a sulfur chloride to a halogenated ethylene free of hydrogen and containing at least three fluorine atoms at 100° to 150° C. under pressure. The resulting polyfluoroethyl sulfides are new chemical products.

In the preferred procedure, the sulfur chloride and the tetrahaloethylene containing at least three fluorine atoms are brought into contact and heated in a reaction zone at a temperature of 100° to 150° C. under pressure. The resulting saturated chloropolyfluoroethyl sulfides are separated by fractional distillation. The new chemical products bis(2-chloropolyhaloethyl) sulfides containing five halogen atoms attached to each ethyl group of which at least three are fluorine atoms are thus obtained. From one to five sulfur atoms are usually attached between the ethyl groups in these new compounds, although some higher sulfides may be formed.

This invention is further illustrated by the following example in which the parts are given by weight, unless otherwise specified.

Example I

A silver-lined pressure vessel is filled to 14% of its capacity with 94 parts of sulfur monochloride. The vessel is then flushed with oxygen-free nitrogen, closed, cooled in a mixture of Dry Ice and methanol, evacuated, charged with 140 parts of tetrafluoroethylene, again sealed, and heated at 125° C. for 9 hours. After cooling the reactor and releasing the gas pressure, there is obtained 168 parts of a yellow, liquid product corresponding to a yield of about 60% based on fluorine content. Fractional distillation of the product gives the following principal fractions:

| | Parts |
|---|---|
| (1) 68–72° C./760 mm | 12 |
| (2) 120–140° C./760 mm | 70 |
| (3) 84–88° C./40 mm | 12 |
| (4) 130–141° C./38 mm | 15 |

After washing with 10% sodium carbonate solution remove any sulfur chloride, the largest fraction (2) distills mainly at 141–142° C. Analysis shows this to be bis(2-chloro-1,1,2,2-tetrafluoroethyl) disulfide. Calculated for $(ClCF_2CF_2)_2S_2$: C, 14.3; Cl 21.2; F, 45.4; S, 19.1. Found C, 14.8; Cl, 20.2; F, 47.1; S, 18.8. The other fractions contain differing amounts of sulfur and appear to result from disproportionation reactions. The low-boiling material contains some of the monosulfide $(ClCF_2CF_2)_2S$. Fraction (3) approximates the trisulfide $(ClCF_2CF_2)_2S_3$, in composition and fraction (4) has a higher sulfur content than fraction (3) and contains tetra, penta and higher sulfides.

Similar results are obtained when the tetrafluoroethylene in the above example is replaced with 163 parts of monochlorotrifluoroethylene. Two hundred parts of product is obtained in this case.

Tetrahaloethylenes containing at least three fluorine atoms are suitable for use in this invention. These include tetrafluoroethylene, monochlorotrifluoroethylene, monobromotrifluoroethylene and monoiodotrifluroethylene. Tetrafluoroethylene and monochlorotrifluoroethylene are particularly preferred since they are very reactive and readily accessible.

Sulfur halides suitable for use in this invention include sulfur monochloride and sulfur dichloride. When sulfur dichloride is used, a higher proportion of monosulfide is formed. Sulfur monochloride is preferred because is reacts very readily to give a high yield of polyfluoroalkyl sulfides.

The molar ratio of sulfur chloride to fluoroethylene can be varied within wide limits, for example from 0.25 to 4 moles of sulfur chloride per mole of fluoroethylene. It is preferred to use an excess of the sulfur chloride as this results in more complete utilization of the more expensive fluoroethylene. However, it is advantageous to use an excess of fluoroethylene when a pure product is desired since it can be more readily removed by flash distillation.

The reaction is preferably carried out at a temperature in the range of 100 to 150° C. and under pressures up to 2000 p. s. i. Pressures above 2000 p. s. i. can be employed but are not preferred since their use requires special equipment. At temperatures below 100° C. the reaction is impractically slow while an undesirable side reaction, the dimerization of the polyfluoroethylene, becomes rapid at temperatures in excess of 150° C. In order to minimize the tendency of the polyfluoroethylene, particularly tetrafluoroethylene, to polymerize, the oxygen in the reactor is preferably replaced by an inert gas such as nitrogen.

The products from this invention are stable, polyfluoroethyl sulfides containing at least six fluorine atoms and from one to five sulfur atoms per molecule. These products are bis(2-chloropolyhaloethyl) sulfides containing five halogen atoms attached to each ethyl group of which at least three are fluorine atoms. The mono, di, tri, tetra and penta sulfides are formed with some higher sulfides. For example, the products from tetrafluoroethylene are bis(2-chlorotetrafluoroethyl) sulfides containing from one to five sulfur atoms. The bis(2-chlorotetrafluoroethyl) disulfide is a particularly preferred product since it is readily prepared in high yield. When monochlorotrifluoroethylene is reacted with the sulfur chloride there are formed bis(2-chloropolyhaloethyl) sulfides containing five halogen atoms attached to each ethyl group of which two are chlorine atoms and three are fluorine atoms.

The products of this invention are useful as modifiers for diene polymerizations, rubber chemicals, insecticides, and as intermediates for the preparation of polysulfide elastomers and for the manufacture of chlorofluoroethanesulfonic acids and chlorofluoroethyl mercaptans.

As many apparently widely different embodiments of this invention may be made without departing from the spirit and scope thereof, it is to be understood that I do not limit myself to the specific embodiments thereof except as defined in the appended claims.

I claim:
1. A bis(2-chloropolyhaloethyl) disulfide containing five halogen atoms attached to each ethyl group of which at least three are fluorine atoms.
2. The chemical product bis(2-chloro-1,1,2,2-tetrafluoroethyl) monosulfide.
3. The chemical product bis(2-chloro-1,1,2,2-tetrafluoroethyl) disulfide.
4. A bis(2-chloropolyhaloethyl) disulfide containing five halogen atoms attached to each ethyl group of which two are chlorine atoms and three are fluorine atoms.
5. A process for preparing saturated polyfluoroethyl sulfides which comprises bringing a chloride of sulfur and a tetrahaloethylene containing at least three fluorine atoms into contact, heating said substances in a reaction zone under pressure at a temperature from 100° to 150° C., and subsequently separating therefrom a bis(2-chloropolyhaloethyl) sulfide containing five halogen atoms attached to each ethyl group of which at least three are fluorine atoms.
6. A process as set forth in claim 5 in which said chloride of sulfur is sulfur monochloride.
7. A process as set forth in claim 5 in which said chloride of sulfur is sulfur dichloride.
8. A process as set forth in claim 5 in which said tetrahaloethylene is tetrafluoroethylene.
9. A process as set forth in claim 5 in which said chloride of sulfur is sulfur monochloride and said tetrahaloethylene is monochlorotrifluoroethylene.
10. A process as set forth in claim 5 in which said chloride of sulfur is from 0.25 to 4 moles per mole of tetrahaloethylene.
11. A bis(2-chloropolyhaloethyl) sulfide containing not more than five sulfur atoms and having five halogen atoms attached to each ethyl group of which at least three are fluorine atoms, the sulfur atoms being at least two when each ethyl group contains not more than three fluorine atoms.
12. A process for preparing bis(2-chloro-1,1,2,2-tetrafluoroethyl) disulfide which comprises bringing sulfur monochloride and tetrafluoroethylene into contact, heating said substances in a reaction zone under pressure at a temperature from 100° to 150° C. and subsequently separating therefrom bis(2-chloro-1,1,2,2-tetrafluoroethyl) disulfide.

MAYNARD S. RAASCH.

REFERENCES CITED

The following references are of record in the file of this patent:

UNITED STATES PATENTS

| Number | Name | Date |
|---|---|---|
| 2,199,361 | Lincoln et al. | Apr. 30, 1940 |
| 2,396,788 | Hoffman | Mar. 19, 1946 |

FOREIGN PATENTS

| Number | Country | Date |
|---|---|---|
| 694,885 | Germany | July 14, 1935 |

OTHER REFERENCES

Guthrie, Beilstein, 4th ed., vol. I, page 349, 1918.